Patented Oct. 17, 1944

2,360,673

UNITED STATES PATENT OFFICE 2,360,673

OXIDIZED POLYMERS AND PROCESS FOR THEIR PREPARATION

William E. Hanford, Westwood Manor, Del., assignor to E. I. du Pont de Nemours & Company, Wilmington, Del., a corporation of Delaware No Drawing. Application January 10, 1942, Serial No. 426,341

7 Claims. (Cl. 260—537)

This invention relates to a process for the preparation of carboxylic acids, and more particularly to a method for preparing aliphatic alpha,omega-dicarboxylic acids.

Aliphatic alpha,omega-dicarboxylic acids are of great importance as intermediates in the preparation of many types of linear condensation polymers. Thus, for example, they may be condensed with glycols to produce long-chain polyesters, with diamines to produce long-chain polyamides, with amine alcohols to produce long-chain polyester-amides, etc.

It is known that unusual and valuable properties may be imparted to these polymers by employing two or more such polycarboxylic acids in their preparation. For example, the polyamide prepared by heating a mixture of adipic and sebacic acids with hexamethylenediamine has solubility and pliability characteristics which are quite different from what might be expected from the known properties of polyhexamethylene adipamide and polyhexamethylene sebacamide. This modification in properties can be extended even further by employing more than two such dibasic acids in the polymer formation.

Unfortunately, with few exceptions, the aliphatic alpha,omega-dicarboxylic acids are not easy to prepare. Short chain acids, such as adipic, succinic and pimelic can be made readily, and sebacic acid can be prepared from castor oil. The synthesis of the other aliphatic alpha,-omega-dicarboxylic acids, however, especially those of chain lengths longer than sebacic, offers considerable difficulty.

It is an object of this invention to provide a new and useful method for preparing aliphatic dicarboxylic acids. A further object is to provide a simple and direct method for simultaneously oxidizing and cleaving the chain of polymers of ethylene with one or more vinyloxy compounds to a mixture of carboxylic acids rich in alpha,-omega-dicarboxylic acids.

The above and other objects are accomplished, according to this invention, by subjecting to oxidation, preferably in the presence of a catalyst, a polymer of ethylene with one or more vinyloxy compounds. When thus oxidized, simultaneous oxidation and chain cleavage occurs to yield a mixture of carboxylic acids which is rich in alpha,omega-dicarboxylic acids.

As the oxidizing agent there can be employed such materials as: the higher oxides of nitrogen; chromic acid, permanganates; molecular oxygen or air; or nitric acid. Of these oxidizing agents, nitric acid is preferred, specifically aqueous nitric acid containing from 25 to 70% $HNO_3$.

The temperatures employed in the oxidation may vary over a wide range, although preferably temperatures from about 50° C. up to the boiling point of the oxidation mixture under ordinary pressures are employed.

As this invention is generally practiced, the ethylene/vinyloxy polymer is mixed with the nitric acid containing a small amount of catalyst, e. g., vanadium pentoxide or a vanadium salt such as ammonium vanadate, and the mixture heated to reflux, where it is maintained until evolution of nitrogen oxides ceases. The reaction mixture is permitted to cool, the greasy solid which separates is removed, washed free of nitric acid with large quantities of water, and then treated with a reducing agent, e. g., stannous chloride and hydrochloric acid to eliminate small quantities of nitro compounds which are formed in the oxidation. The resulting mixture of acids may then be purified either by recrystallization or by conversion to the methyl esters and fractional distillation.

The examples which follow are submitted to illustrate and not to limit this invention. Unless otherwise stated, parts are by weight.

Example 1

Forty-three and one-half parts of a polymer of ethylene with vinyl acetate having an intrinsic viscosity of 0.5 (0.125 per cent solution in xylene at 85° C.) is mixed with 150 parts of 54.5 per cent aqueous nitric acid. The mixture is boiled under reflux for 5 hours, at the end of which time the evolution of oxides of nitrogen has practically ceased. The reaction mixture is cooled, and the greasy solid which forms is separated by filtration. This product is then refluxed with a solution of 20 parts of stannous chloride, 46 parts of 6 N hydrochloric acid, and 250 parts of water for 1 hour. The product is separated by filtration, washed with water, and dried. The material thus obtained has a neutral equivalent of 144 corresponding to a mixture of dibasic acids having an average chain length of 16 carbon atoms.

An additional amount of lower molecular weight acids can be obtained by removing the nitric acid from the original reaction mixture filtrate by steam distillation under reduced pressure.

The polymer used in the above example is conveniently prepared by the following procedure.

A 400 cc. stainless steel lined reactor is charged with 60 parts of freshly distilled vinyl acetate, 140 parts of deaerated water, 0.4 part benzoyl peroxide, and 5 parts of the sodium salt of sulfated 9,10-octadecenyl acetate. The pH of the mixture is adjusted to 3.1. The reaction vessel is closed, agitated, heated to 85° C., and pressured with ethylene to between 700 and 980 atmospheres. The pressure is maintained within the indicated range by periodic additions of ethylene. After completion of the reaction, as evidenced by cessation of pressure drop, the reaction vessel is cooled, bled of excess ethylene, and the vessel discharged. The reaction mixture is then steam distilled to remove unreacted vinyl acetate and acetaldehyde, and the polymer dried.

*Example 2*

A mixture containing 50 parts of a polymer of ethylene with vinyl acetate, prepared by a procedure similar to that described in Example 1, 212 parts of concentrated nitric acid (70% $HNO_3$), 150 parts of water, and 1 part of ammonium vanadate is boiled under reflux for 6 hours, at the end of which time evolution of oxides of nitrogen has practically ceased. The product is separated by filtration, and purified as in Example 1. The resulting mixture of dibasic acids has a neutral equivalent of 505, corresponding to an average chain length of 68 carbon atoms.

The process described in the above examples is generally applicable to any polymer of ethylene with a vinyloxy compound. These polymers may be prepared either by the method described in U. S. Patent 2,200,429 or in the copending application of R. E. Brooks, M. D. Peterson, and A. G. Weber, Ser. No. 383,546; W. E. Hanford, Ser. Nos. 383,554 and 383,555; and H. S. Young, Ser. No. 383,553, all filed on March 15, 1941, or in the application of H. S. Young, Ser. No. 403,534, filed July 22, 1941.

The term "vinyloxy" as used herein refers to compounds conforming to the general formula, $H_2C=CHOR$, wherein R is selected from the class of hydrocarbon radicals, preferably alkyl radicals, and acyl radicals. Examples of such compounds include vinyl acetate, vinyl propionate, vinyl butyrate, vinyl isobutyrate, vinyl formate, and other vinyl esters; vinyl ethers, such as methyl and propyl vinyl ethers, vinyl butyl ether and other vinyl ethers.

The term "polymer" as used herein refers to the products obtained by polymerizing ethylene with one or more vinyloxy compounds by any one of the methods disclosed in the hereinabove mentioned patents and patent applications.

The oxidation of the ethylene/vinyloxy polymers can be carried out over a wide range of conditions and methods of procedure. Thus, the ethylene/vinyloxy polymer can be added directly to the oxidizing solution at the desired temperature or, preferably, all of the reactants can be mixed at room temperature and the reaction mixture then heated to the temperature at which it is desired to effect the oxidation. The oxidation can be conducted effectively with nitric acid of concentrations ranging from about 25 to about 70 per cent by weight and at temperatures in the range of from about 50° C. to the boiling point of the oxidation mixture under ordinary pressures. Catalysts such as ammonium vanadate and other vanadium salts, such as, sodium vanadate and also vanadium oxides are, preferably, added to the oxidizing agent.

In practicing the invention it is generally preferred to use nitric acid of from about 35 to 55 per cent concentration and an amount of ammonium vanadate or other vanadium salt catalyst ranging from about 0.15 per cent to about 2 per cent, based upon the weight of the ethylene/vinyloxy polymer.

The amount of nitric acid employed should be at least sufficient to oxidize completely the ethylene/vinyloxy polymer although, generally, it is desirable to use a large excess of the acid over the amount theoretically required to oxidize completely the ethylene/vinyloxy polymer.

The mixture of aliphatic alpha,omega-dicarboxylic acids produced by the process of this invention are useful in the preparation of condensation-type linear polymers such as polyesters, polyester-amides polyamides, etc. They can also be used for the synthesis of synthetic waxes, plasticizers, etc.

Various changes may be made in the details and preferred embodiments of this invention without departing therefrom or sacrificing the advantages thereof.

I claim:

1. A process for the production of alpha, omega-dicarboxylic acids which comprises treating with an oxidizing agent comprising nitric acid in the presence of a catalyst, and at a temperature of at least 50° C., a polymer prepared by polymerizing ethylene together with at least one vinyloxy compound.

2. A process for the production of alpha, omega-dicarboxylic acids which comprises treating with an oxidizing agent comprising nitric acid, in the presence of an oxidation catalyst, and at a temperature of at least 50° C., a polymer prepared by polymerizing ethylene together with at least one vinyloxy compound.

3. A process for the production of alpha, omega-dicarboxylic acids which comprises treating with an oxidizing agent comprising nitric acid in the presence of from 0.15 to 2% of ammonium vanadate, based on the weight of the polymer, and at a temperature of at least 50° C., a polymer prepared by polymerizing ethylene together with at least one vinyloxy compound.

4. A process for the production of alpha, omega-dicarboxylic acids which comprises treating with an oxidizing agent comprising nitric acid of 25 to 70% concentration, in the presence of from 0.15 to 2% of ammonium vanadate, based on the weight of the polymer, and at a temperature of at least 50° C., a polymer of ethylene with at least one vinyloxy compound.

5. A process for the production of alpha, omega-dicarboxylic acids which comprises admixing about 43.5 parts by weight of a polymer, prepared by polymerizing ethylene together with vinyl acetate, with about 150 parts by weight of 54.5% aqueous nitric acid, heating the mixture under reflux-boiling conditions for about 5 hours, cooling and separating the solid product, purifying said product by treating with acidic stannous chloride solution, and recovering a mixture of alpha,omega-dicarboxylic acids.

6. A process for the production of alpha, omega-dicarboxylic acids which comprises heating with an oxidizing agent comprising nitric acid, in the presence of catalytic amounts of ammonium vanadate, a polymer prepared by polymerizing ethylene together with at least one vinyloxy compound.

7. A process for the production of alpha, omega-dicarboxylic acids which comprises treating with an oxidizing agent, selected from the group consisting of nitric acid and higher oxides of nitrogen, a polymer prepared by polymerizing ethylene together with at least one vinyloxy compound, the oxidizing treatment being carried on in the presence of a catalyst and at a temperature of at least 50° C.

WILLIAM E. HANFORD.